United States Patent [19]

Morris

[11] 4,446,951

[45] May 8, 1984

[54] VEHICLE FULL PARK ENGAGEMENT APPARATUS

[76] Inventor: George R. Morris, 5643 E. Albain Rd., Monroe, Mich. 48161

[21] Appl. No.: 322,650

[22] Filed: Nov. 18, 1981

[51] Int. Cl.$^3$ .............................................. B60K 41/26
[52] U.S. Cl. ................................ 192/4 A; 74/473 SW
[58] Field of Search ............................... 192/4 R, 4 A; 74/473 SW, 470

[56] References Cited

U.S. PATENT DOCUMENTS 3,858,456  1/1975  Bahl et al. .............................. 74/491
3,952,838  4/1976  Osten et al. ............................ 188/31

Primary Examiner—George H. Krizmanich
Assistant Examiner—M. Manley
Attorney, Agent, or Firm—Basile, Weintraub & Hanlon

[57] ABSTRACT

A vehicle park engagement apparatus for a vehicle enables the vehicle transmission selector lever to be fully urged into the park position detent. The apparatus includes a bracket for rotatably supporting one end of a bell crank rod which is rotatably mounted at an opposed end in a fixed position on the vehicle. The bracket is constructed so as to allow translation of the one end of the bell crank rod after the transmission linkage has fully engaged the park position stop to permit further travel of the selector lever into the park position detent. In one embodiment, the bracket is provided with an elongated, horizontally extending slot to permit translation of the one end of the bell crank rod. In another embodiment, the bracket is movably placed into engagement with the vehicle so as to enable the bracket and the bell crank rod rotatably mounted therein to translate after the transmission linkage has stationarily engaged the park position in the transmission.

5 Claims, 4 Drawing Figures

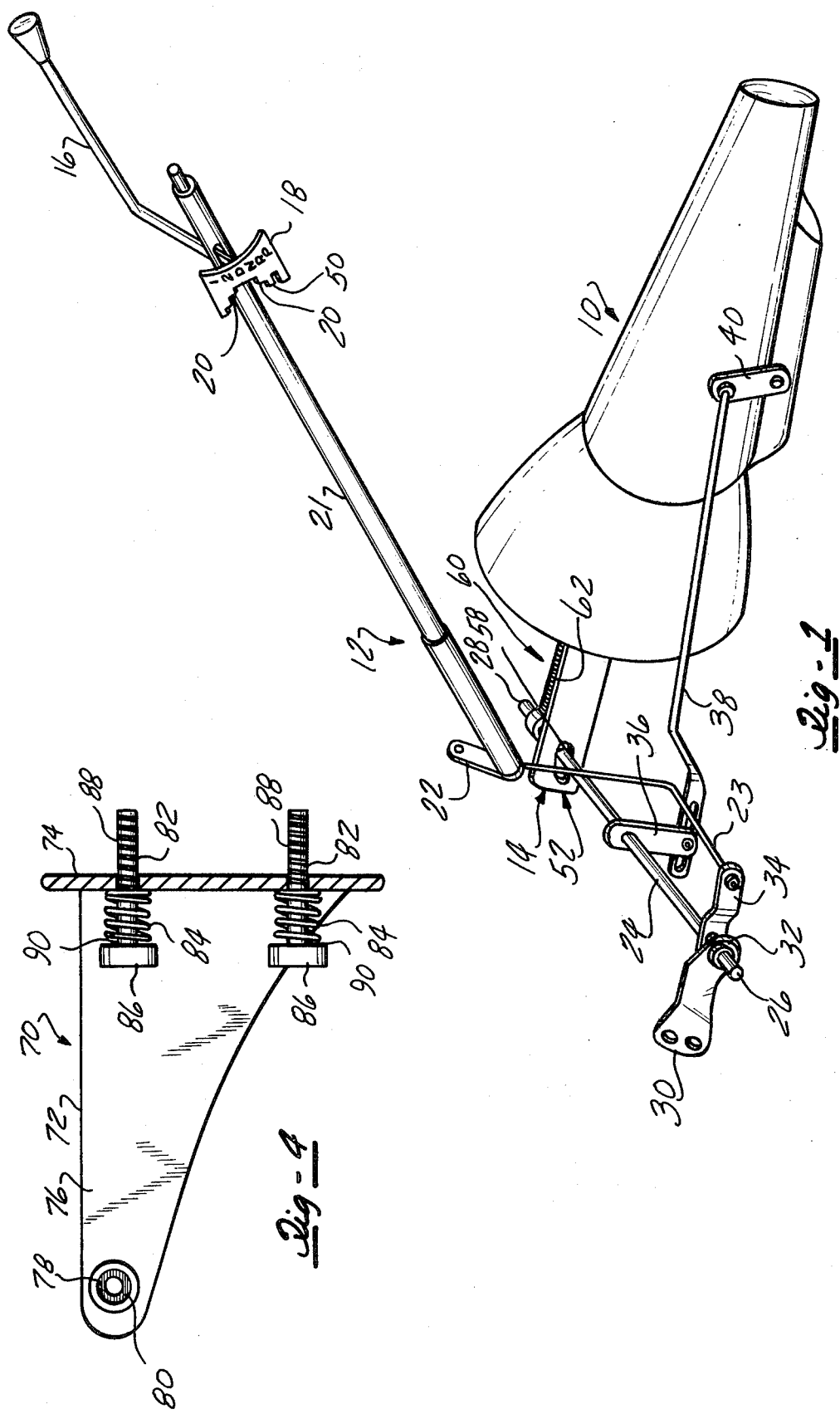

VEHICLE FULL PARK ENGAGEMENT APPARATUS

BACKGROUND OF THE INVENTION

1. Field of the Invention:

This invention relates, in general, to automatic vehicle transmission linkages and, more specifically, to automatic vehicle transmission linkages permitting full park position engagement of the transmission selector lever.

2. Description of the Prior Art:

In automatic transmissions of a type found in vehicles, such as automobiles, a linkage is utilized to connect and transmit movement of the transmission selector lever located within the interior of the vehicle to the transmission to enable the driver to select one of the operative states of the transmission.

As is well known, the selector lever is manually moved by the driver between one of the desired vehicle states and is engaged in one of a series of spaced detents in a detent plate mounted on the steering column so as to securely retain the selector lever in the desired position. The selector arm rotates a transmission select column mounted within the steering column.

A link connected to the transmission select column transmits rotation of the transmission select column by the selector lever to rotation of a bell crank rod which is rotatably mounted at both ends in brackets affixed to the vehicle frame and/or engine. An arm is secured to the bell crank rod and is movable therewith. A transmission rod is connected between a transmission control lever mounted on the transmission and the arm affixed to the bell crank rod and is oscillated by rotation of the bell crank rod to select one of the forward drive states, neutral, reverse or park modes of the transmission.

Such bell crank linkages are designed to operate efficiently and safely. However, situations occur in which the selector lever, while indicated to be in the park position, has not fully engaged the park detent in the detent plate. This can be caused by improper linkage adjustment, the installation of improper, out-of-specification or defective parts and/or assembly error.

Thus, it would be desirable to provide a vehicle full park engagement apparatus which overcomes the problems of previously devised vehicle transmission linkages in preventing undesired selector lever movement. It would also be desirable to provide a vehicle full park engagement apparatus which ensures that the vehicle transmission selector lever can be fully engaged in the park detent. Finally, it would be desirable to provide a vehicle full park engagement apparatus which may be installed as a simple and inexpensive modification on existing vehicles.

SUMMARY OF THE INVENTION

There is disclosed herein a unique vehicle full park engagement apparatus which enables the vehicle transmission selector lever to be fully engaged in the park position detent. The apparatus includes a bracket for rotatably supporting one end of a bell crank rod which is rotatably supported at an opposed end in a fixed position on the vehicle. The bracket is constructed so as to allow translation of the one end of the bell crank rod after the transmission linkage has fully engaged the park position stop to permit further travel of the selector lever into the park position detent.

In one embodiment, the bracket is provided with an elongated, horizontally extending slot to permit translation of the one end of the bell crank rod. A biasing means, such as a coil spring, is secured around the one end of the bell crank rod to bias the bell crank rod to one end of the horizontally extending slot in the bracket for normal rotation and movement.

In another embodiment, the bracket is movably biased into engagement with the vehicle so as to enable the bracket and the bell crank rod rotatably mounted therein to translate after the transmission linkage has engaged the park position stop.

The vehicle full park engagement apparatus of the present invention overcomes the problems encountered in vehicle transmissions in which the selector lever can not be fully urged into the park position detent. By providing a bracket for rotatably supporting one end of the bell crank rod which allows translation of the one end of the bell crank rod after the transmission control linkage has fully engaged the park stop in the transmission, further travel of the selector lever is possible so as to enable the selector lever to be fully urged into the park position detent.

The vehicle full park engagement apparatus of the present invention is simply constructed which enables it to be easily and inexpensively added as a modification on existing vehicles to overcome the aforementioned problems.

BRIEF DESCRIPTION OF THE DRAWING

The various features, advantages and other uses of the present invention will become more apparent by referring to the following detailed description and drawings in which:

FIG. 1 is a perspective view of a vehicle transmission control linkage and transmission incorporating a vehicle full park engagement apparatus constructed in accordance with the teachings of the present invention;

FIG. 4 is an elevational view of another embodiment of the vehicle full park engagement apparatus of the present invention.

DESCRIPTION OF THE PREFERRED EMBODIMENTS

Figure 3:
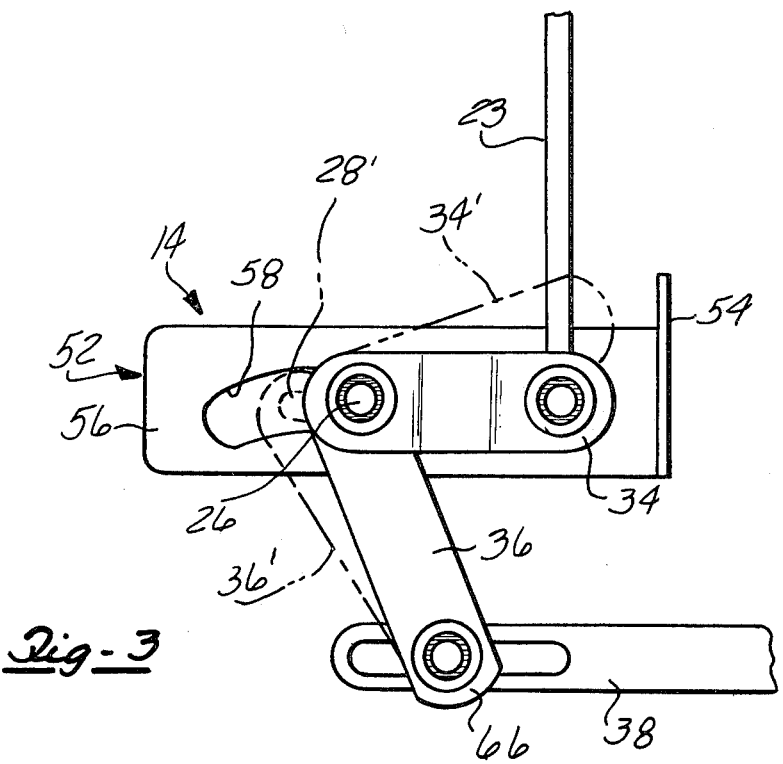
FIG. 3 is an elevational view of the vehicle full park engagement apparatus of the present invention with the components thereof illustrated in a translated position.

Throughout the following description and drawings, an identical reference number is used to refer to the same component shown in multiple figures of the drawing.

Referring now to the drawing, and to FIG. 1 in particular, there is illustrated a vehicle transmission 10 and transmission control linkage 12 which incorporates a vehicle full park engagement apparatus 14 constructed in accordance with the teachings of the present invention. The vehicle full park engagement apparatus 14 is constructed so as to enable the transmission selector lever to be urged to full engagement with the park position detent.

As is conventional, the transmission control linkage 12 includes a selector lever 16 which is manually movable between a plurality of positions corresponding to each of the transmission operative states or modes. These positions correspond to each of the forward gears of the transmission, such as drive, first and second, as well as neutral, reverse and park modes.

One end of the selector lever 16 engages a detent plate 18 which includes a plurality of spaced detents 20, each of which corresponds to one of the transmission modes.

The transmission control linkage 12 includes a first linkage means comprising en elongated rotatable transmission select column 21 which is rotatably mounted within the steering column of the vehicle, not shown. The selector lever 16 extends through an aperture formed in one end of the transmission select column 21 so as to selectively rotate the transmission select column 21 simultaneously with rotation of the selector lever 16. An elongated plate 22 is fixedly secured to the opposed end of the transmission select column 21 and has one end of a first link 23 pivotally secured thereto. In this manner, rotation of the selector lever 16 between the various detents in the detent plate 18 is transmitted through the transmission select column 21 and the elongated plate 22 to the first link 23.

The transmission control linkage 12 further includes a bell crank rod 24 having first and second ends 26 and 28, respectively. The bell crank rod 24 is pivotally oriented perpendicular to the transmission select column 21.

First mounting means, denoted in general by reference number 30, is provided for rotatably securing the first end 26 of the bell crank rod 24 in a fixed position on the vehicle. In a preferred embodiment, the first mounting means 30 comprises a bracket which is securable to the vehicle and/or engine by conventional fasteners. The bracket 30 includes an aperture having a self-aligning bearing 32 mounted therein for rotatably receiving the first end of the bell crank rod 24.

The second end 28 of the bell crank rod 24 is rotatably supported in a second mounting means as described hereafter such that the bell crank 24 rotates about an axis extending through the bell crank rod 24. A first arm 34 is fixedly secured to the bell crank rod 24 adjacent the first end 26. A second end of the first link 23 is pivotally connected to the arm 34 so as to transmit movement of the link 23 to rotation of the arm 34 and the bell crank rod 24. In this manner, movement of the selector lever 16 between the various detent positions 20 in the detent plate 18 causes varying degrees of rotation of the bell crank rod 24.

The transmission control linkage 12 further includes second linkage means comprising a second arm 36 and an elongated bell crank to transmission rod 38. The second arm 36 is fixedly secured at one end to an intermediate portion of the bell crank rod 24. The opposed end of the second arm 34 is pivotally connected to one end of the transmission to bell crank rod 38 so as to transmit rotation of the bell crank rod 24 to substantially horizontal oscillatory movement of the rod 38. The opposed end of the rod 38 is connected to a pivotal transmission control lever 40 mounted on the transmission housing. The transmission control lever 40 rotates a shaft, not shown, extending into the interior of the transmission housing for selecting the various operative states of the transmission.

For reasons of clarity, the internal workings of the transmission 10, which do not form a part of the subject invention, are not shown.

As noted previously, a problem may be encountered when the selector lever is urged by the driver towards the park position until internal resistance is met and the lever is indicated as being in the park position. In these instances, due to linkage misalignment and other aforementioned problems, the selector lever may not have fully engaged the park detent in the detent plate and will be positioned on the notch, such as notch 50 in FIG. 1, between the park and reverse detents. When this occurs, the selector lever can inadvertently slip back to the reverse detent thereby placing the transmission in gear and causing vehicle movement.

It is to this problem that the full park engagement device 14 is directed. As shown in FIG. 1, and in greater detail in FIGS. 2 and 3, the vehicle full park engagement apparatus 14 includes a second mounting means 52, such as a bracket, which is secured to the vehicle and/or engine by suitable fasteners, such as screws, bolts, etc. The bracket 52 is substantially L-shaped in configuration and includes a first leg portion 54 having apertures therein adapted to receive mounting fasteners for securing the bracket 52 to the vehicle. The bracket 52 also includes an integral elongated flange portion 56.

The vehicle full park engagement apparatus 14 of the present invention includes means, associated with the second bracket 52, for allowing translation of the second end 28 of the bell crank rod 24 after the rod 38 has been urged rearward until the transmission control lever 40 has engaged the internal transmission park stop such that the selector lever 16 can be further urged into full engagement with the park detent in the detent plate 18.

In a preferred embodiment, the means for permitting translation of the second end 28 of the bell crank rod 24 comprises the bracket 52 having an elongated, substantially horizontally extending slot 58 formed in the flange portion 56. The slot 58, which may be curved downward slightly at one end, slidably receives the second end 28 of the bell crank rod 24 for rotatably supporting the bell crank rod 24 therein.

Biasing means 60 are provided for biasing the second end 28 of the bell crank rod 24 to one end of the slot 58 in the bracket 52 so as to hold the bell crank rod 24 stationary during rotation thereof throughout the various operative states of the transmission, as selected by the selector lever 16. In a preferred embodiment, the biasing means 60 comprises a coil spring 62 having one end secured to the bracket 52 and an opposed end secured to an eyelet 64 which is adapted to be disposed around the second end 28 of the bell crank rod 24. The coil spring 62 is constructed with sufficient spring force so as to hold the bell crank rod 24 stationary until sufficient force is exerted on the linkage by the selector lever 16 to overcome the spring force of the spring 62 and permit forward movement of the bell crank rod 24 within the slot 58, as described in greater detail hereafter. It should also be noted that other types of biasing means, such as leaf springs, deformable bodies, etc., are also within the scope of the present invention.

In operation, the biasing means 60 will hold the second end 28 of the bell crank rod 24 stationary against one end of the slot 58 in the bracket 52 during rotation of the bell crank rod 24 as the selector lever 16 is moved throughout the various detents 20 on the detent 18. When the selector lever 16 is urged towards the park detent in the detent plate 18, the first linkage, the bell crank rod 24 and the second linkage will interact to rotate the transmission control lever 40 until it engages the park stop within the transmission thereby holding the second linkage in a fixed stationary position. As noted above, in certain conditions, the selector lever 16, although indicated as being positioned in the full park detent, may actually be disposed on the notch 50 between the park and reverse detents in the detent plate 18 so as not to be fully engaged in the park detent.

Figure 2:
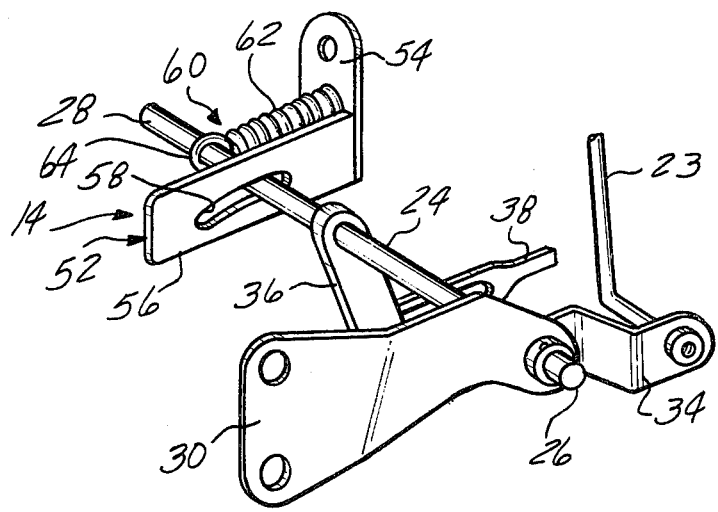
FIG. 2 is an enlarged perspective view of one embodiment of the vehicle full park engagement apparatus of the present invention.

The force exerted by the driver on the selector lever 16 to urge the selector lever 16 into the park detent will be transmitted through the first linkage and bell crank 24 to overcome the biasing force of the biasing means 60 on the second end 28 of the bell crank rod 24 and cause the second end 28 of the bell crank rod 24 to translate from a first position shown in FIGS. 1 and 2, and in solid in FIG. 3, to a second translated position, depicted in phantom in FIG. 3 by reference number 28'. During such movement, the first end 66 of the arm 36 and the bell crank to transmission rod 38 will remain in a stationary position since the transmission control lever 40 has abutted the park stop within the transmission. The arm 36 will thus rotate about the first end 66 to a position indicated in phantom by reference number 36'.

Thus, during conventional operation when the selector lever 16 is moved between the various forward drive states, neutral and reverse, the bell crank rod 24, which is biased to a stationary position abutting one end of the slot 58 in the bracket 52, will rotate about an axis extending between its first and second ends 26 and 28. As the selector lever 16 is urged towards the park detent in the detent plate 18, movement of the selector lever 16 will result in the transmission control lever 40 engaging the internal transmission park stop thereby stationarily fixing the rod 38 and the end 66 of the arm 36 in a fixed position. Further movement of the selector lever 16 towards the park detent will overcome the biasing force of the spring 62 and result in movement of the bell crank rod 24 about an axis extending between the first end 26 of the bell crank rod 24 and the end 66 of the arm 36.

This movement or translation of the bell crank rod 24 will cause the arm 34 attached to the first link 23 to pivot in a counter-clockwise direction to a position illustrated in phantom by reference number 34' in FIG. 3. This rotation of the arm 34 will permit the first link 23, plate 22 and transmission column 21 to rotate enabling further travel of the selector lever 16 into the full park detent in the detent plate 18 thereby fully engaging and holding the selector lever 16 in the park detent and preventing inadvertent movement of the selector lever 16 out of the full park detent.

Referring now to FIG. 4, there is illustrated by reference number 70 another embodiment of the vehicle full park engagement apparatus of the present invention which permits translation of one end of the bell crank rod 24. In this embodiment, a second bracket 72 is formed with a first leg portion 74 and a flange portion 76. The flange portion 76 has an aperture 78 formed therein in which is mounted a self-centering bearing 80 which rotatably receives the second end 28 of the bell crank rod 24.

The leg portion 74 of the bracket 72 is provided with one and preferably a pair of spaced apertures 82 which are adapted to receive suitable fasteners 86 for securing the bracket 72 to the vehicle. Preferably the fasteners 86 comprise cap screws having a first threaded section 88 insertable through the apertures 82 into engagement with the vehicle to mount the bracket 72 thereon and a second unthreaded section 90.

In this embodiment of the vehicle full park engagement apparatus, biasing means 84 are associated with the fasteners 86 for movably biasing the second bracket 72 into engagement with the vehicle. The biasing means 84, which is preferably in the form of a coil spring, is disposed around the second portion 90 of each fastener 86 and is provided with sufficient spring force to hold the bracket 72 in engagement with the vehicle as the selector lever 16 is moved through the various detent positions towards the full park position. When the full park position is reached, force exerted on the selector lever 16 will be transmitted through the first link 23 and bell crank rod 24 to the bracket 72 and will overcome the biasing force provided by the biasing means 84 to permit the bracket 72 to pull away from the vehicle. This allows the second end 28 of the bell crank rod 24 to translate and provide further travel of the selector lever 16 such that the selector lever 16 may be fully urged into the park detent in the detent plate 18.

It should also be noted that although the vehicle full park engagement apparatus of the present invention has been described and illustrated in connection with the second end 28 of the bell crank rod 24, the present invention is usable on either end of the bell crank rod 24. That is, the bracket which includes means for allowing translation of one end of the bell crank rod may be positioned so as to rotatably and movably support the first end 26 of the bell crank rod 24 with the opposed second end 28 being rotatably mounted in a fixed position on the vehicle.

Thus, there has been described a unique full park engagement apparatus which ensures that the transmission selector lever may be fully urged into the park detent. This overcomes linkage misalignment and other aforementioned problems which prevent the selector lever from being fully urged into the park detent. The vehicle full park engagement apparatus of the present invention is of simple construction and inexpensive cost which enables it to be used and quickly installed as a modification on existing vehicles.

What is claimed is:

1. In a vehicle transmission including a selector lever movable between a plurality of positions, each associated with a distinct vehicle movement state and a park position, a detent plate associated with the selector lever and having a plurality of detent positions, each associated with one of the vehicle movement states and the park position, a bell crank rod having first and second ends, a first mounting bracket fixedly secured to the vehicle and rotatably supporting the first end of the bell crank rod in a fixed position, a first linkage means connected between the selector lever and the bell crank rod for transmitting movement of the selector lever to rotation of the bell crank rod, a second linkage means connected between the bell crank rod and the transmission for transmitting rotation of the bell crank rod to the vehicle transmission for selecting one of the vehicle movement states and the park position, the improvement comprising:

a full park engagement apparatus including:
   a second bracket secured to the vehicle for rotatably supporting a second end of the bell crank rod; and
   means, associated with the second bracket, for allowing translation of the second end of the bell crank rod after the second linkage means has stationarily engaged the transmission park position to permit further travel of the selector lever such that the selector lever is fully urged into the park detent in the detent plate.

2. The improvement of claim 1 wherein the means for allowing translation of the bell crank rod comprises:

the second bracket having an elongated slot formed therein adapted to slidingly receive and support the second end of the bell crank rod; and means for biasing the second end of the bell crank rod to one end of the slot.

3. The improvement of claim 2 wherein the biasing means includes a coil spring connected between the second bracket and the second end of the bell crank rod.

4. The improvement of claim 1 wherein the means for allowing translation of the bell crank comprises:

means for biasing the second bracket into engagement with the vehicle, the biasing means allowing movement of the second bracket after the second linkage means has stationarily engaged the transmission park position to enable translation of the second end of the bell crank rod.

5. The improvement of claim 4 wherein the biasing means comprises:

at least one fastening means for securing the second bracket to the vehicle; and biasing means, associated with the second bracket and the fastening means, for movably securing the second bracket of the vehicle.

* * * * *